US009570997B2

(12) United States Patent
Theiler

(10) Patent No.: US 9,570,997 B2
(45) Date of Patent: Feb. 14, 2017

(54) CONTROLLED POWER SUPPLY CIRCUIT

(75) Inventor: Helmut Theiler, Lieboch (AT)

(73) Assignee: AMS AG, Unterpremstaetten (AT)

( * ) Notice: Subject to any disclaimer, the term of this patent is extended or adjusted under 35 U.S.C. 154(b) by 665 days.

(21) Appl. No.: 14/007,428

(22) PCT Filed: Feb. 14, 2012

(86) PCT No.: PCT/EP2012/052493
§ 371 (c)(1),
(2), (4) Date: Dec. 5, 2013

(87) PCT Pub. No.: WO2012/130518
PCT Pub. Date: Oct. 4, 2012

(65) Prior Publication Data
US 2014/0306530 A1      Oct. 16, 2014

(30) Foreign Application Priority Data
Mar. 28, 2011   (DE) ........................ 10 2011 015 282

(51) Int. Cl.
H02M 3/335    (2006.01)
H02M 3/158    (2006.01)
H05B 33/08    (2006.01)

(52) U.S. Cl.
CPC ....... *H02M 3/33561* (2013.01); *H02M 3/1584* (2013.01); *H05B 33/0815* (2013.01); *H05B 33/0827* (2013.01); *H02M 2003/1586* (2013.01); *Y02B 20/347* (2013.01); *Y10T 307/406* (2015.04)

(58) Field of Classification Search
None
See application file for complete search history.

(56) References Cited

U.S. PATENT DOCUMENTS 5,736,881 A    4/1998  Ortiz
6,400,101 B1   6/2002  Biebl et al.
7,825,644 B1   11/2010 Ling
(Continued)

FOREIGN PATENT DOCUMENTS

DE    19930174 A1   1/2001
DE    10346528 A1   4/2004
(Continued)

*Primary Examiner* — Jared Fureman
*Assistant Examiner* — Aqeel Bukhari
(74) *Attorney, Agent, or Firm* — McDermott Will & Emery LLP

(57) ABSTRACT

A power supply circuit for supplying power to at least two loads which are connected to said power supply circuit comprises a current source which can be operated in a clocked manner and has a control input for adjusting the power. At least two load strings are connected in parallel between a power supply connection, which is coupled to the current source, and a reference connection. Each load string has a load and charge storage means which is connected in parallel with the load. A switch is used to selectively switch the current path of the load string. A sensor having a sensor resistor which is connected in the current path of the load string is used to detect a current flowing through the connected load string. Furthermore, the controlled power supply circuit comprises a control circuit which is coupled to the switch and to the sensor of each load string for the purpose of activating each load string in a time-multiplexed manner.

12 Claims, 13 Drawing Sheets

(56) References Cited

U.S. PATENT DOCUMENTS

| | | | |
|---|---|---|---|
| 7,906,917 B2 * | 3/2011 | Tripathi | H05B 33/0803 315/291 |
| 2004/0066154 A1 | 4/2004 | Ito et al. | |
| 2007/0080911 A1 | 4/2007 | Liu et al. | |
| 2008/0116818 A1 | 5/2008 | Shteynberg et al. | |
| 2008/0259252 A1 | 10/2008 | Tanaka et al. | |
| 2008/0290815 A1 | 11/2008 | Yamada | |
| 2009/0015172 A1 | 1/2009 | Huang et al. | |
| 2009/0021384 A1 | 1/2009 | Jacubovski et al. | |
| 2009/0322234 A1 | 12/2009 | Chen et al. | |
| 2010/0033109 A1 | 2/2010 | Liu et al. | |
| 2010/0283322 A1 | 11/2010 | Wibben | |
| 2011/0068700 A1 | 3/2011 | Fan | |

FOREIGN PATENT DOCUMENTS

| | | |
|---|---|---|
| DE | 10259353 A1 | 7/2004 |
| DE | 10344966 A1 | 4/2005 |
| DE | 102006032247 A1 | 1/2007 |
| JP | 2010-067557 A | 3/2010 |
| WO | 02/093541 A1 | 11/2002 |
| WO | 2007/039862 A2 | 4/2007 |
| WO | 2008/110990 A1 | 9/2008 |
| WO | 2009/019634 A1 | 2/2009 |
| WO | 2009/138505 A1 | 11/2009 |

* cited by examiner

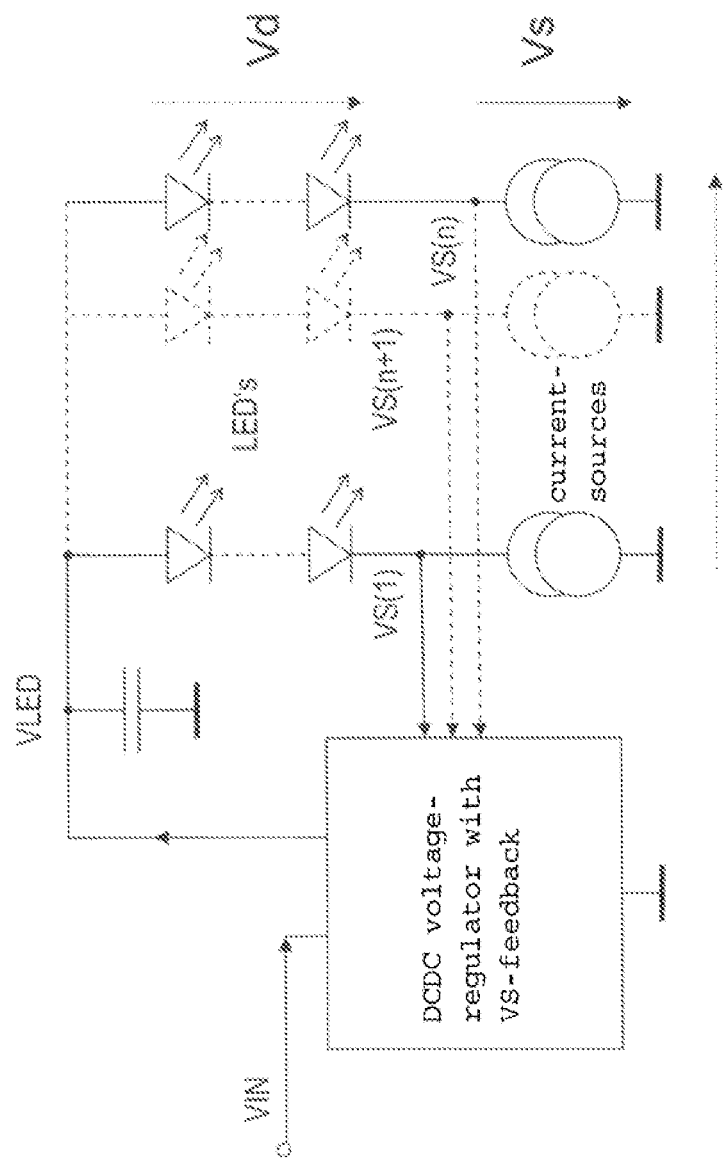

CONTROLLED POWER SUPPLY CIRCUIT

The invention pertains to a controlled power supply circuit for supplying power to at least two loads connected thereto.

DC/DC converters are frequently used as switching controllers that utilize coils in order to supply a predetermined voltage. They consequently form current or voltage sources and serve for supplying power to connected loads.

FIG. 1A shows such an example, in which a DC/DC converter is used for supplying power to several load strings or load chains. The individual load strings are connected to the DC/DC converter in parallel and are supplied with the voltage VLED by this DC/DC converter. To this end, the converter receives a control signal VS for adjusting the output voltage VLED from each load chain, wherein the control signal is essentially derived from a voltage that drops across the respective load.

The illustrated arrangement is sufficient as long as the connected loads have approximately the same voltage drop during operation. Only a slight differential voltage drops across the connected controlled current sources in this case, wherein said differential voltage ultimately results from the voltage VLED supplied by the adjusted DC/DC converter and the voltage drop across the connected load. In this case, VS=LED−Vd applies, wherein Vd is the voltage drop across the load and VS is the respective voltage drop across the controlled current source.

In modern screens, backlighting is generated by means of LED strings. DC/DC converters are also used in these applications for making available the required supply voltage and the required supply current. In instances in which no locally different illumination or merely large-surface sectors with different illumination are required, only a few segments are used for the backlighting. Each of these segments comprises a plurality of light-emitting diodes that are connected in series and form the LED strings. In this case, each string may comprise up to 150 light-emitting diodes that are connected in series such that voltage drops of 100 to 500 V occur across each string.

Voltage differences in the individual chains can amount to several 10s of V due to process fluctuations or different numbers of LEDs. In the implementation according to FIG. 1A, unacceptably high power losses therefore occur across individual controlled current sources.

This is the reason why dedicated voltage converters are used for activating such long LED chains. FIG. 1B shows a simplified embodiment in which a dedicated DC/DC voltage converter is provided for each individual LED string. This voltage converter comprises a coil, a switching transistor and a control circuit. The control circuit controls the transistor in accordance with a control signal Vsense such that a predetermined current is individually adjusted for each LED string during the operation.

In comparison with FIG. 1A, however, this solution is much more elaborate because each individual load string is provided with a dedicated control that not only results in an increased space requirement due to the coils and switching transistors used, but also in an increased manufacturing effort and therefore additional costs.

The invention therefore aims to disclose a controlled power supply circuit in which load strings with different voltage drops can also be operated without significant power loss.

This objective is attained with the object of the independent claim. Enhancements and embodiments form the objects of the dependent claims.

According to the inventive principle, it is proposed to activate several load strings that are arranged in parallel in a time-multiplexed fashion rather than simultaneously. In this way, a defined current can be adjusted for each load at a resulting supply voltage such that the losses are minimized.

A controlled power supply circuit for supplying power to at least two loads connected thereto therefore may comprise a current source that can be operated in a clocked fashion and that features a control input for adjusting the current. At least two load strings are connected in parallel between a power supply terminal that is coupled to the current source and a reference terminal. In this case, each of these load strings features a load, as well as a charge storage means that is connected in parallel to the load. A switch is respectively provided for selectively switching the current path of the load string. Each load string furthermore features a sensor with a sensor resistor that is connected to the current path of the load string and serves for registering a current flowing through the load string when the load string is connected by the switch. A control circuit that is coupled to the switch and to the sensor of each load string serves for activating each load string in a time-multiplexed fashion. In this way, the energy stored in the current source is distributed over the individual load strings in the form of current pulses.

In one embodiment, the current source comprises an energy storage means such as, for example, a coil that delivers a current to the load strings during the operation. The clocked current source may be designed for filling the energy storage means during a first time period and for delivering the energy stored therein to the load strings arranged in parallel during a second time period.

In one embodiment, a current is built up in a coil of the current source in order to thusly store magnetic energy that is subsequently delivered to at least one of the load strings in the form of a current.

Due to the charge storage means used in parallel to the load, current pulses are stored while each load string is activated in a time-multiplexed fashion and the current flowing through the load is smoothed. In this way, a sufficient voltage and current supply of each load string is ensured during its active phase, i.e., while it is supplied with current by the current source, and during the passive phase, during which power is supplied by the charge storage means.

The sensor registers the current that is connected by the switch and flows through the load string and transmits this current to the control circuit. The control circuit activates each load string in a time-multiplexed fashion and also adjusts the clocked current source to the requirements of each load string. Since each load string is activated in a time-multiplexed fashion, the load strings may even have different voltage drops and still be operated by means of an individual DC/DC converter or another suitable current source.

The charge storage means connected in parallel to the respective load serve for buffering the energy supplied in the form of current pulses and make it possible to simultaneously couple different loads to a current source.

In one embodiment, the control input of the DC/DC current source is coupled to the sensors. In this way, the DC/DC current source receives a signal of the sensor that indicates whether the respective load string is sufficiently supplied with current during its operation. In response to the sensor signal, the DC/DC current source accordingly adjusts the output current to the value required for the operation while each load string is activated in a cyclic fashion.

Depending on the activation of the current source during the operation of the controlled power supply circuit, it is proposed to couple the last sensor of the load string activated by the control circuit during one cycle of a time-multiplexed activation of each load string to the control input of the current source.

In one embodiment of the invention, each load string features a diode, preferably a Schottky diode, that is connected in series to the switch and to the parallel connection between the charge storage means and the load. In this way, negative voltages or potentials caused by a different voltage drop of the individual parallel-connected loads are prevented from occurring at the switch. In another embodiment, the power supply circuit comprises a diode, the cathode side of which is connected to the at least two load strings and the anode side of which is connected to the power supply terminal. This optionally provided diode reduces voltage fluctuations on the supply line and prevents the common circuit node of all loads from experiencing the voltage jumps relative to the reference potential that occur at the output of the clocked current source during the operation. An also optionally provided charge storage means that is connected to the reference potential in parallel to the at least two load strings reduces voltage jumps on the supply line during the switching phases between load strings.

In one embodiment, the sensor resistor serves as a current-voltage converter that may be arranged between the switch of the respective load string and a reference potential. The current-voltage converter sends a signal to a voltage integrator that delivers, in particular, an integrated evaluation signal to the control circuit or directly to the current source in dependence on a reference signal and the correspondingly integrated signal made available by the sensor.

In this case, the voltage integrator may comprise an operational amplifier, as well as a charge storage means connected between an input and an output of the operational amplifier. The voltage integrator may also be designed for generating an evaluation signal of the reference signal and a signal of the current-voltage converter. The evaluation signal makes it possible to adjust whether the current source should deliver a higher or lower current to the respective load in the next cycle. The inventive arrangement consequently forms a control loop with several load strings that are activated by means of time-multiplexing.

A predetermined current can also be intentionally adjusted for the respective load string with the aid of the reference signal. This makes it possible to realize, for example, luminosity adjustments of light-emitting diodes by means of a variable power supply.

In another embodiment, the control circuit comprises a ring counter that is coupled to the switch of each load string in order to activate the respective load string in a cyclic fashion. Each load string is periodically activated within one cycle with the aid of the ring counter. The clock signal of the ring counter may also be used for activating the current source that can be operated in a clocked fashion. In this embodiment, the current source therefore adjusts the respective current required for the operation during or prior to the activation of each load string.

In one embodiment, the control circuit is designed for respectively skipping or activating selective load strings during a cyclic activation. This makes it possible to control a pulse width-modulated energy supply to the individual load strings.

Several exemplary embodiments of the invention are described in greater detail below with reference to the drawings. In this respect, the exemplary embodiments are not limited to their specific illustration. Individual elements of the embodiments can be combined without contradicting the basic principle of the present invention. Identically acting or functioning components are furthermore identified by the same reference symbols. In the drawings:

FIG. 1A shows a known embodiment of a power supply circuit,

Figure 1B:
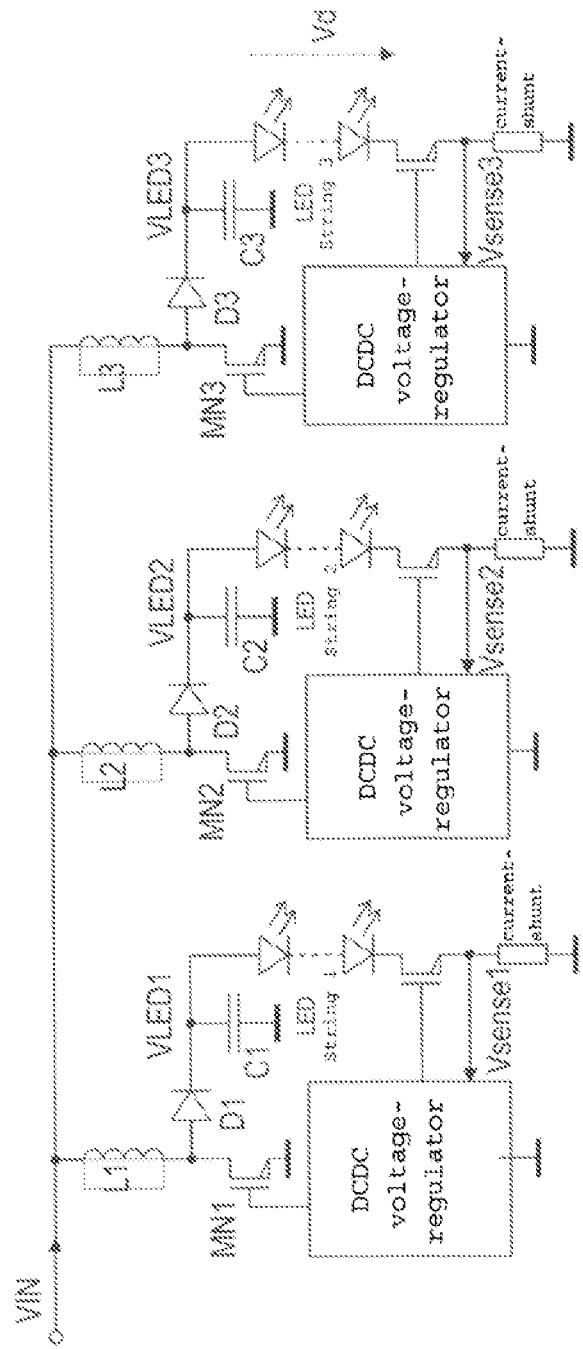
FIG. 1B shows another known embodiment of a power supply circuit.
Figure 2:
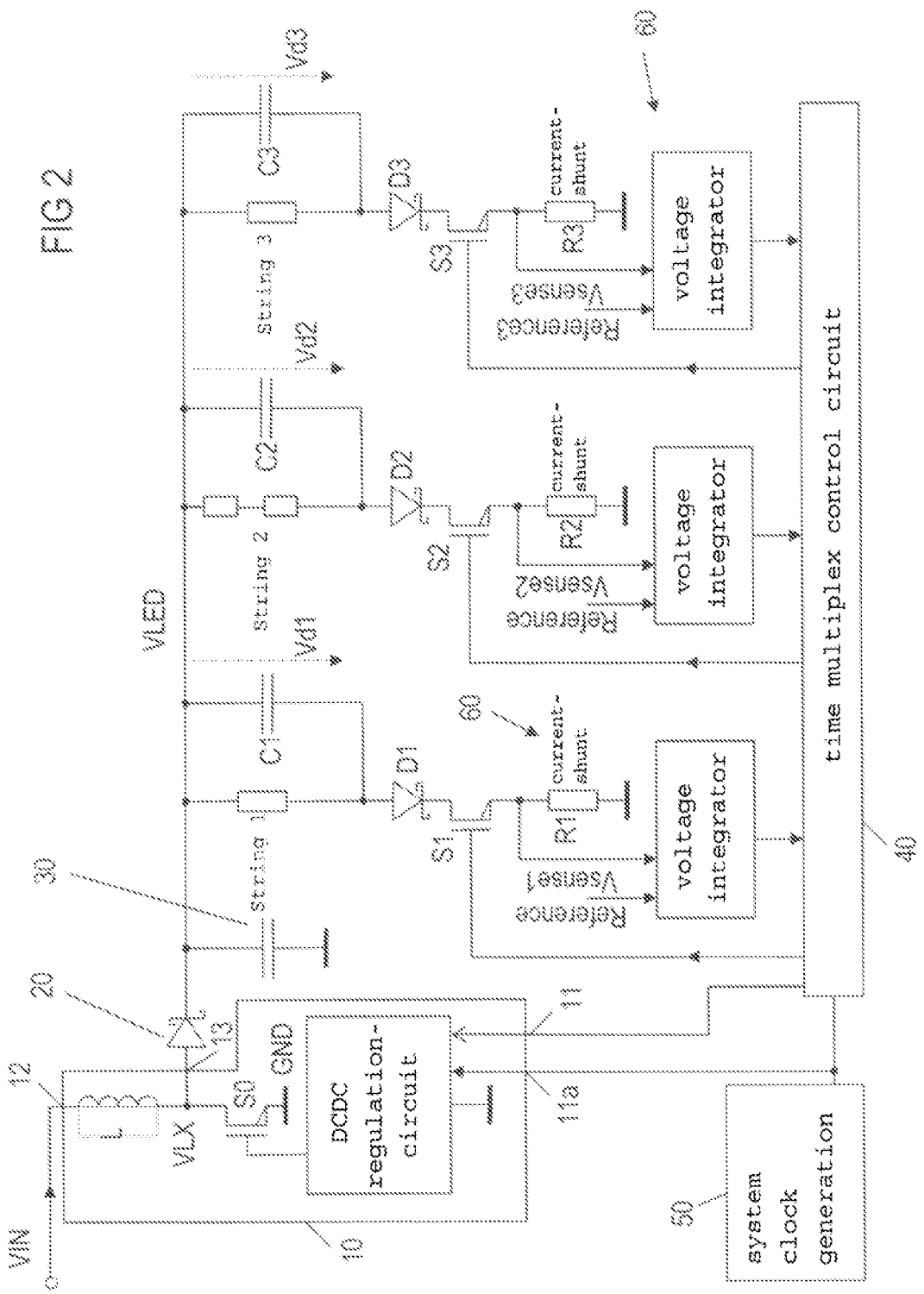
FIG. 2 shows a first embodiment of the invention.

FIG. 2 shows a first embodiment of the invention. The controlled power supply circuit comprises a current source 10 that can be operated in a clocked fashion and that features a supply voltage terminal 12, a control terminal 11, a clock signal terminal 11a and a power supply terminal 13. Three load strings String 1 to String 3 are coupled to the power supply terminal 13 as shown. For this purpose, an additional diode 20 is connected between the power supply terminal 13 and the individual load strings 1, 2 and 3. A buffer capacitor 30 is arranged parallel thereto. The diode 20 and the capacitor 30 are optional.

Each load string comprises a load and a charge storage means C1, C2, C3 that is connected in parallel to the respective load. The individual loads are indicated with resistors in this case. However, this includes any type of consumers that may form serial or series circuits. A diode, preferably a Schottky diode D1, D2, D3, is coupled to the base of each load, as well as to a charge storage means arranged parallel thereto. The cathode of each Schottky diode is in turn coupled to a switch S1, S2 or S3 that is connected to a sensor 60 for registering a current signal. However, the sequence of this series circuit is not restricted in any way. For example, the Schottky diodes D1, D2, D3 may also be connected, e.g., between the node VLED and the parallel circuit formed by the buffer capacitor and the load. The sensor 60 comprises, in particular, a voltage integrator and a respective sensor resistor R1, R2 or R3 that is connected to the respective switch S1, S2 or S3 and to a reference potential GND. Consequently, the load in the respective string is connected between the power supply terminal 13 with the supply voltage VLED and the ground potential GND.

The sensor 60 delivers a signal to a time-multiplex control circuit 40 that is coupled to the respective switches S1, S2 and S3 in order to activate the individual load strings in a time-multiplexed fashion. In addition, the time-multiplex control circuit 40 generates a control signal at the control input 11 of the current source 10. An arrangement 50 that is connected to the current source as well as to the time-multiplex control circuit 40 is furthermore provided for realizing the system clock generation.

The current source that can be operated in a clocked fashion comprises a DC/DC control circuit with a control signal input 11. The output signal of the DC/DC control controls a switching transistor S0 that is connected between the ground potential GND and a coil L. During the operation of the DC/DC current source 10, the switch S0 is switched within periodic intervals such that a magnetic field builds up due to the inductance in the coil L and energy therefore is stored in the coil. The pulse-pause ratio, with which the switch S0 is actuated, is dependent on control signals of the time-multiplex circuit 40. Due to the clocked operation, the energy stored in the field is delivered to the power supply terminal 13 via the node VLX in order to supply power to the individual loads in the Strings 1, 2 and 3.

As already mentioned above, the sensor 60 of each load string comprises the current sensor R1, R2, R3 that is respectively realized in the form of a resistor in this case. A node between the respective switch of each load string and the resistor registers the voltage Vsense that drops across the resistor and forwards this voltage to the voltage integrator. The voltage integrator integrates the difference between the signals Vsense and Reference. It subsequently delivers a signal to the time-multiplex control circuit 40 in dependence on this difference.

The comparison between the voltage signal Vsense and the reference signal Reference in the voltage integrator makes it possible to control the process of switching the switches S1, S2 and S3 on and off. Accordingly, a supply current flowing through the load String 1 can be adjusted by means of the reference signal Reference. The time-multiplex control circuit therefore activates the individual load strings String 1, String 2, String 3 in dependence on the adjusted reference signal and also controls the current source 10 via the control input 11.

During an operation of the power supply circuit shown, the DC/DC control circuit of the current source 10 closes the switch S0 for a certain duration per period such that a current builds up in the coil L and energy is stored. The duration of the "on"-state of the switch S0 is defined by the control signal at the control input 11.

The energy stored in the coil L increases over this duration. After switching off the switch S0, the time-multiplex control circuit activates the switch S1 such that the energy stored in the coil is partially consumed directly by the load in the load String 1 and partially stored in the capacitor. The voltage that drops across the load is simultaneously stored in the capacitor C1. After a certain time period that is defined, for example, by the reference signal Reference in the first sensor 60, the time-multiplex control circuit opens the switch S1 and closes the switch S2.

This causes the individual strings String 1, String 2 and String 3 to be switched through in a cyclic fashion. The time-multiplex control circuit 40 simultaneously registers if the energy stored in the coil L does not suffice for supplying power to all three strings. If this is the case, the DC/DC voltage regulator is activated accordingly in the next cycle such that, for example, the switch S0 remains in the "on"-state for a longer time period and the coil therefore stores more energy.

The switches S1, S2 and S3 make it possible to activate the individual load strings in a time-multiplexed fashion. It is advantageous to provide dedicated storage capacitors C1, C2 and C3 for each string in order to allow different resistances in the individual load strings. These storage capacitors are connected in parallel to the respective load string such that the respective node between the load and the downstream diode has a floating potential. Consequently, the capacitors are not connected to the reference potential GND.

Due to the time-multiplex control circuit, each individual load string is only acted upon with a current for a short time. During the operation, the capacitors accommodate the initially very high current of the coil L and thusly ensure a more uniform course of the load current. A differential resistance of the load during the operation of the respective load string multiplied by the capacitance of the individual buffer capacitors results in a time constant that essentially corresponds to a current ripple in the current path of each load string. At a load in the form of a 100Ω resistance and a switching time of 10 µs, the capacitors C1, C2, C3 need to have a capacitance of approximately 1 µF in order to realize a 10% current fluctuation. The capacitance of the capacitors therefore is chosen such that the resulting time constant in the form of the product of the resistance of the load and the capacitor capacitance is significantly higher than the clock frequency of the clocked current source 10.

When different loads are connected, the Schottky diodes D1, D2 and D3 prevent the drain voltage of a switch in a load string with a high voltage drop from dropping below the reference potential GND while a load string with a low voltage drop is connected. This would cause the switching transistor to become conductive in the reverse mode and to discharge the buffer capacitor such that load strings with a high voltage drop could not be supplied with the desired power.

Due to the design of the circuit with the diodes D1, D2 and D3, preferably Schottky diodes, it is possible to distribute the coil current in the coil L over the individual load strings by means of time-multiplexing, namely even if the individual load strings have significant voltage differences.

Figure 3:
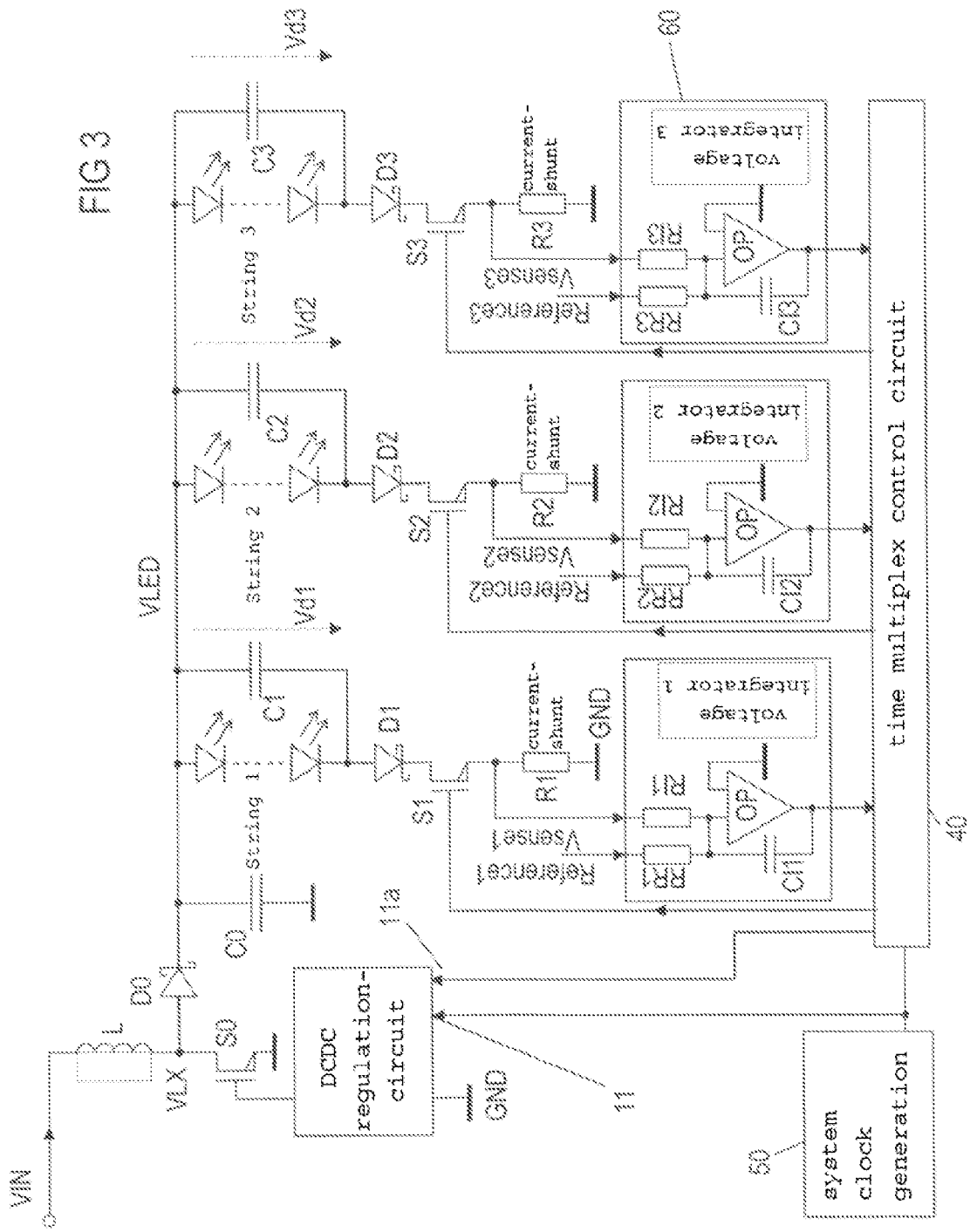
FIG. 3 shows a second embodiment of the invention.

FIG. 3 shows another embodiment of the invention in which the individual loads in the load Strings 1, 2 and 3 are implemented in the form of light-emitting diodes that are connected in series.

The sensor for registering the current flowing through the respective load string not only features its sensor resistor R1, R2 or R3, but also a voltage integrator that is connected to the respective measuring resistor. The voltage integrator comprises an operational amplifier OP with a first non-inverting input that is connected to the reference potential GND. A second input is connected to a node between the switch S1 and the measuring resistor R1 via a resistor RI1. This second input receives the voltage signal Vsense1 derived from the current. A node between the second input of the operational amplifier OP and the resistor RI1 is coupled to a second resistor RR1, to which the reference signal Reference1 is applied. This node is also connected to the output of the operational amplifier OP via a capacitor CI1. The sensors in the second load string and in the third load string are also structured accordingly.

During the operation, the DC/DC control circuit of the current source is once again activated and subsequently actuates the switch S0. The energy stored in the coil L is distributed to the load strings activated by means of the time-multiplex control circuit 40 via the diode D0.

In this embodiment, the switches S1, S2 and S3 are implemented in the form of field effect transistors. Since these field effect transistors form a diode that is reverse-polarized if the drain-source voltage has negative values, the switches are not in an open (i.e. blocking) state as long as the assigned LED string has a higher voltage drop than the LED string currently activated by the time-multiplex control circuit. This is the reason why the Schottky diodes D1, D2 and D3 are provided for separating the individual LED strings from one another. Although the additionally provided diode D0 could be omitted, it reduces the voltage fluctuations that occur at the node VLX on the supply line leading to the individual strings.

The reference signals Reference1, Reference2 and Reference3 fed to the individual voltage integrators of the respective load strings can be used for adjusting the luminosity of each LED series circuit. For this purpose, the current resulting from the subtraction Vsense/RI−Reference/RR is integrated in the capacitor CI. The result is fed to the time-multiplex control circuit that in response activates the respective load string for the appropriate time period only by means of the assigned switch. The current in the corresponding LED strings and therefore the luminosity is adjusted in dependence on the time period of the activated switches S1, S2 or S3. In other words, the time period, in which a respective string is active, is adjusted by forming the difference between the integrated voltage signal Vsense and the reference signal Reference1, Reference2 or Reference3.

Figure 4:
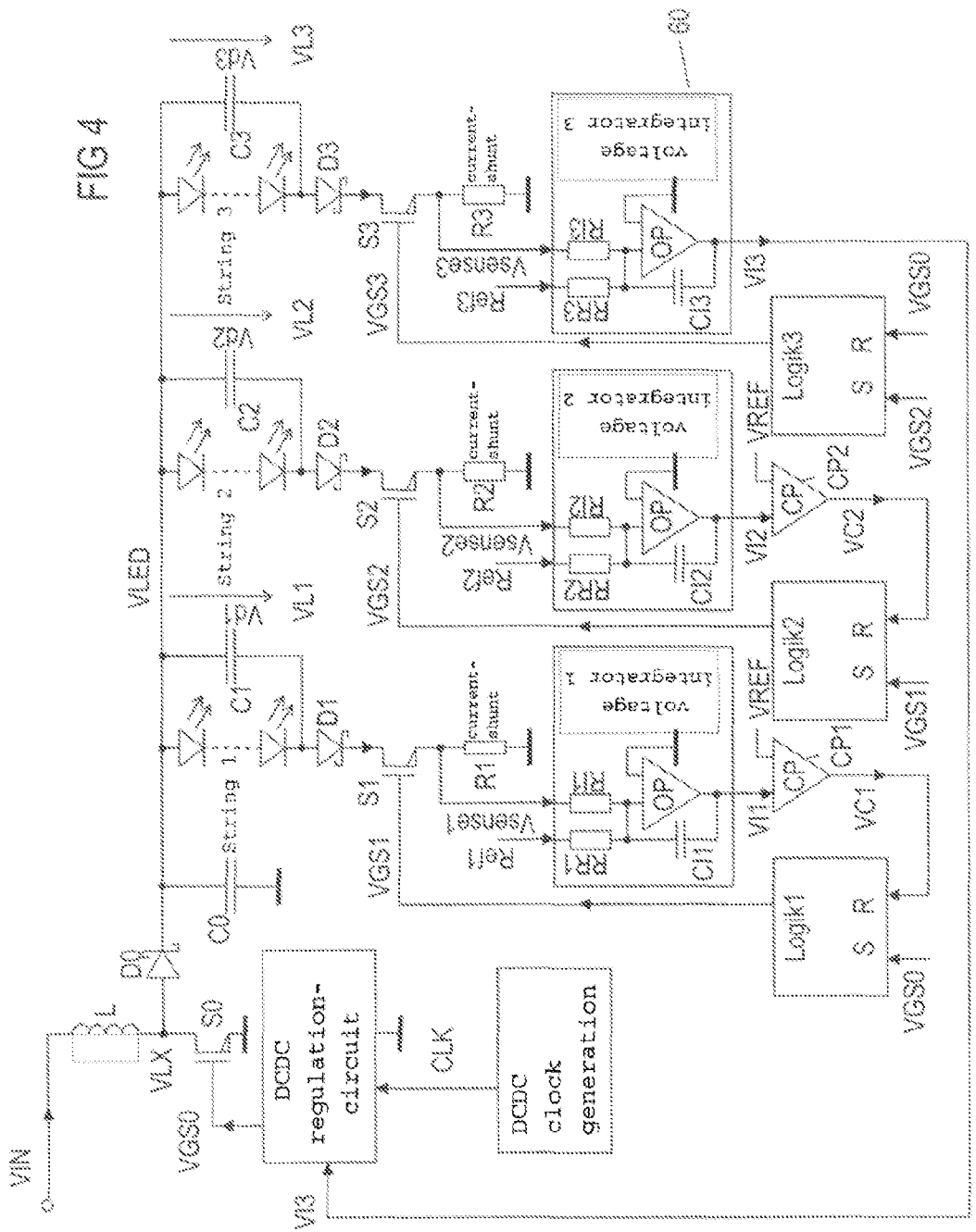
FIG. 4 shows a third embodiment of the invention.

Another embodiment with a variation of a time-multiplex control circuit 40 for activating the current source is illustrated in FIG. 4.

In this case, the time-multiplex control circuit comprises several logic gates that are realized, for example, in the form of flip-flops, wherein the output of these logic gates delivers the respective control signal VGS1, VGS2 or VGS3 to the switches S1, S2 or S3 of the LED Strings 1, 2 or 3. For this purpose, a first logic circuit Logik1 is connected with its output side to the switch S1. The set input S receives the control signal VGS0 that essentially corresponds to the activation signal for the switch S0 of the current source. Another input receives the control signal VC1 that is generated by the comparator CP1 based on a comparison between a reference signal VREF and the voltage signal VI1 delivered by the voltage integrator 1. A second logic circuit Logik2 is connected with its output side to the switch S2 and receives the control signal VGS1, as well as a comparator signal VC2, on its input side. The last LED string String 3, in contrast, is structured in a slightly different fashion. In this case, the output of the voltage integrator 3 is directly connected to the control input of the DC/DC controller of the current source. A logic gate Logik3 delivers the control signal VGS3 to the switch S3 based on the second control signal VGS2 and the DC/DC control signal VGS0.

During the operation of this circuit, a current flowing through the individual strings is registered by the measuring resistors R1, R2 and R3 and converted into a corresponding voltage Vsense1, Vsense2 or Vsense3. This voltage is fed to an integrator together with a corresponding reference signal REF1, REF2 and REF3 with opposite sign. While the reference signal charges the capacitor with a voltage, the registered voltage signal Vsense discharges the capacitor with a higher rate. The resulting voltage signal VI delivered by the operational amplifier is compared with a reference signal in a comparator and serves for activating the respective string, as well as the following string.

This embodiment specifically operates as follows: at a positive clock pulse edge of the clock signal CLK, a clock pulse edge activates the switch S0 such that the coil L connected thereto is "charged" with a current. In this case, the time period is defined by the output voltage of the voltage integrator 3, wherein this time period cannot exceed a predetermined percentage of a period of the clock signal CLK such as, for example, 95%.

At a following clock pulse edge of the control signal VGS0, the transistor S0 blocks while the control signal VGS1 is simultaneously delivered to the switch S1 of the first string by the logic circuit Logik1. Consequently, this string is activated and the coil current flows through the diode D1, the switch S1 and the resistor R1. The current is divided in the parallel circuit formed by the buffer capacitor and the load, wherein the larger portion of the current preferably charges the buffer capacitor. The current flowing through the string is measured in the resistor R1 and converted into a voltage signal Vsense1. The voltage signal is integrated in the voltage integrator and the reference signal Ref1 is subtracted therefrom. As soon as the voltage signal Vsense1 corresponding to the current flowing through the string 1 has compensated the hitherto integrated reference signal Ref1, the comparator CP1 switches through its output signal VC such that the switch S1 is once again opened by the logic circuit.

The switching signal VGS1 is simultaneously fed to the logic circuit Logik2 that delivers the control signal VGS2 to the switch S2 at the negative edge of the signal VGS1. The coil current now flows through the string 2 and simultaneously charges the capacitor C2. In this case, the current flowing through the string is also registered by the measuring sensor R2 and converted into a voltage signal. The voltage signal is integrated in the voltage integrator 2 and processed with the reference signal Ref2. As soon as the integrated voltage signal has compensated the thus far integrated reference signal Ref2, the comparator CP2 switches through and generates the control signal VC2 for opening the switch S2 by means of the logic circuit Logik2. The clock pulse edge in the signal VGS2 is the starting signal for the logic circuit Logik3 that is associated with the last string String 3. This logic circuit generates the control signal VGS3 in response to the control signal VGS2 and thusly activates the String 3. In this case, the coil current now also flows through the String 3 and is converted into a voltage signal Vsense3 by the measuring resistor R3, as well as integrated in the voltage integrator.

In contrast to the switches in the Strings 1 and 2, however, the switch S3 in the String 3 is opened by the next positive edge of the clock signal CLK that causes a clock pulse edge of the control signal VGS0 in the DC/DC control in order to close the switch S0.

At this particular time, the thus far integrated and processed voltage signal Vsense3 and the reference signal Ref3 are also evaluated and fed to the DC/DC control by the voltage integrator VI3. If insufficient current flowed through the third string String 3 during the active phase, this leads to a rise of the signal VI3. This rise is registered by the DC/DC control such that the next pulse of the PWM generator of the DC/DC control has a longer pulse duration. Consequently, the switch S0 remains closed for a longer time period and the coil L stores a correspondingly larger amount of energy than in the preceding cycle.

However, if excessive current flowed through the third LED string, the output voltage VI3 of the voltage integrator drops such that the next pulse of the PWM generator of the DC/DC control, as well as the control signal VGS0, becomes shorter. Consequently, the coil L stores a smaller amount of energy during the next cycle.

A stable control loop for the power supply circuit is realized due to the coupling of the last voltage integrator in the chain to the DC/DC control.

Figure 5:
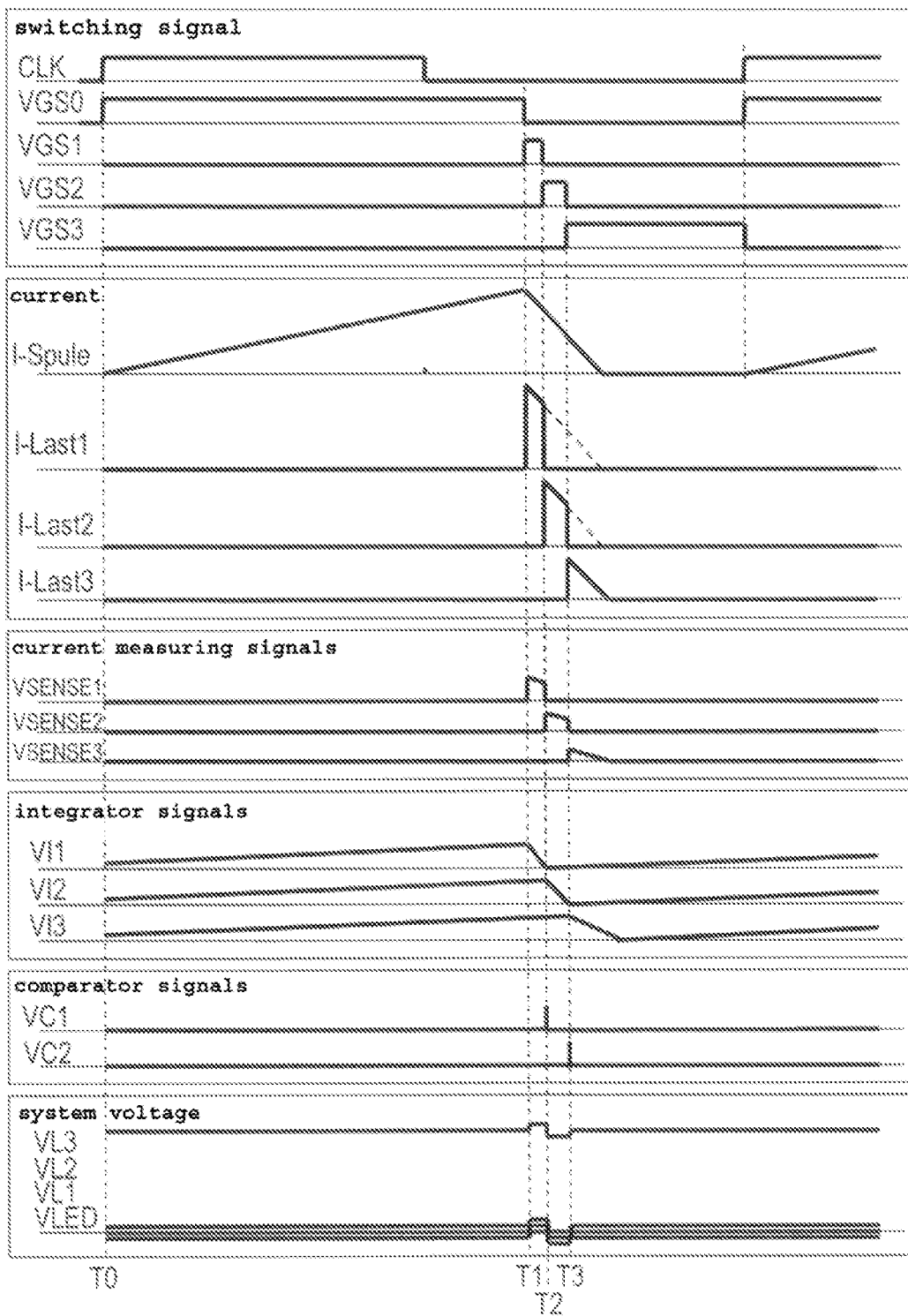
FIG. 5 shows a signal-time diagram in order to illustrate different signal curves in the embodiment according to FIG. 4.

FIG. 5 shows a first signal-time diagram for the so-called discontinuous mode, in which a coil current I-Spule drops to zero before the control signal VGS0 of the DC/DC control is activated.

The switching signals of the clock signal CLK, as well as the control signals VGS0, VGS1, VGS2 and VGS3, are illustrated in the first string. In the exemplary embodiment shown, the control signal VGS0, during which the transistor S0 is active, is longer than one half period of the clock signal CLK due to the control circuit. The coil current I-[Coil] and the energy stored in the coil continuously increase during the time in which the control signal VGS0 remains at a high level. Subsequently, the switch VGS0 is open and the control signal VGS1 is generated by the logic circuit. This switches the first path into the active state such that the current I-Last1 flows through this first path. The current generates the voltage signal Vsense1 in the measuring resistor. The constantly applied reference signal Ref1 allows the output voltage VI1 of the integrator1 to continuously increase up to the time T1, at which the first load string is activated. The resulting drop of the output voltage of the integrator 1 generates a pulse VC1 at the comparator output once the comparator reference is reached such that the control signal VGS1 is deactivated on the one hand and the control signal VGS2 is generated on the other hand.

The coil current now flows through the load String 2 and forms the voltage signal Vsense2. The constantly applied reference signal Ref2 allows the output voltage of the integrator 2 VI2 to continuously increase up to the time T2, at which the load String 2 is activated. The resulting drop of the output voltage of the integrator 2 generates a pulse at the comparator output VC2 once the comparator reference is reached such that the second load string is deactivated and the third load string is activated. The coil current drops to zero in the time that remains until the end of the DC/DC period. If the integral of the current in the third load string is insufficient, the output voltage of the integrator 3 continues to increase from period to period and the amount of energy loaded into the coil by the DC/DC control circuit also continuously increases until a balance is reached. In this adjusted state, the String 3 is also supplied with the correct energy and the output voltage of the integrator 3 neither has an upward nor a downward tendency.

Figure 6:
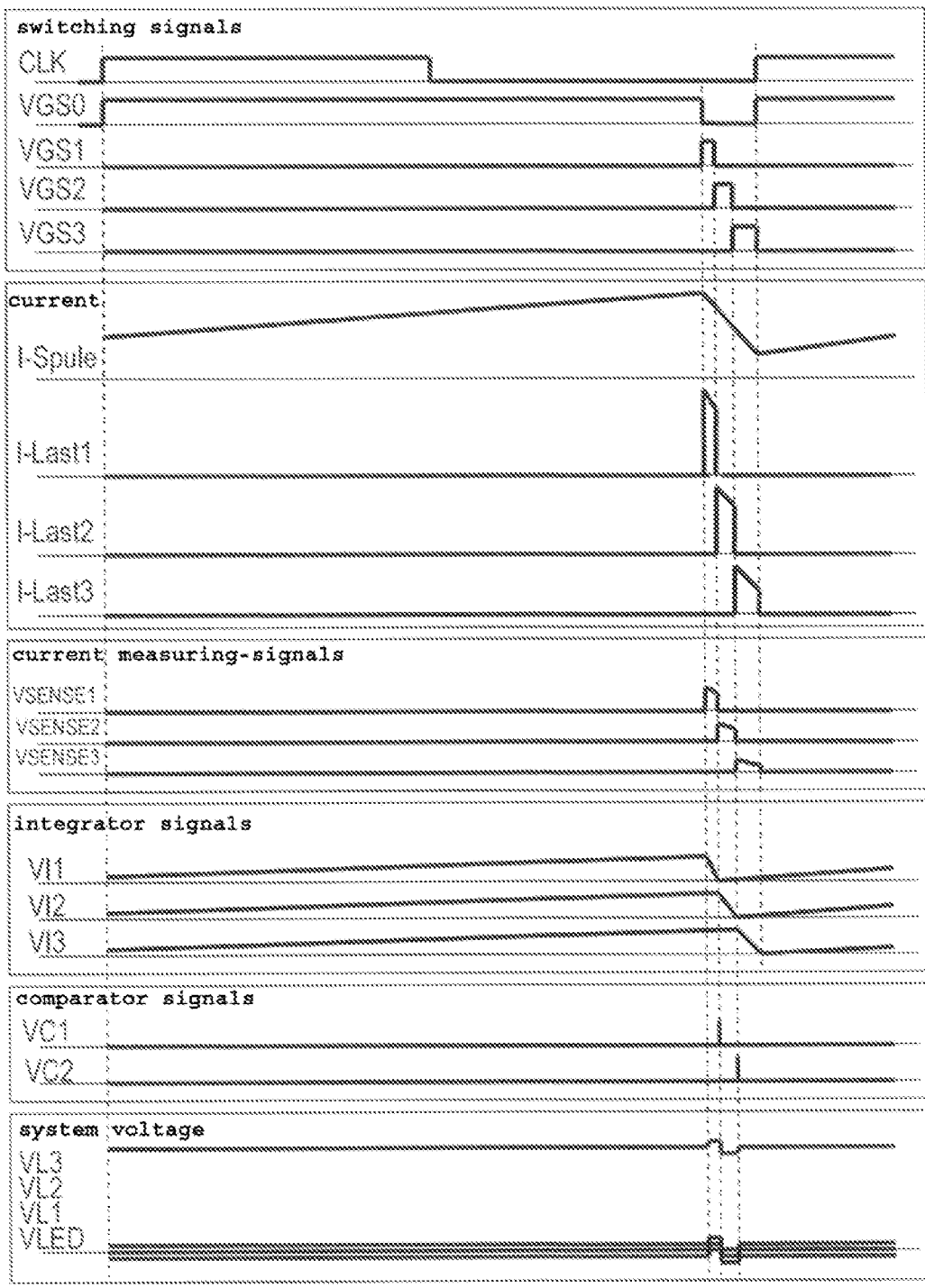
FIG. 6 shows a signal-time diagram in a second operating mode of the embodiment according to FIG. 4.

Another instance that is referred to as the continuous mode is illustrated in FIG. 6. This instance is characterized in that the coil current does not drop to 0 at the end of a cycle, but rather remains at a higher value.

If the voltage across the load strings is very high in comparison with the input voltage VIN, the control signal VGS0 for activating the switch S0 of the current source is active over almost the entire period of the clock signal CLK. During this time period, the current builds up in the coil L and energy is stored therein. The integrator signals VI1, VI2 and VI3 of the voltage integrators rise due to the constantly applied reference signals Ref1, Ref2 and Ref3. The first load string is activated by means of the control signal VGS1 at the negative edge of the control signal VGS0. The coil current flows through the first load string and reduces the energy stored in the coil. The current flows through the measuring resistor R1 and generates the voltage signal Vsense1.

The voltage signal is integrated and compensates the hitherto integrated reference signal until the comparator reference VREF is reached. Once VREF has been reached, the negative edge of the control signal VGS1 and the positive edge of the control signal VGS2 are generated such that the second load string is activated. Once the comparator reference of the integrator output signal 2 is reached, the second load string is deactivated and the third load string is connected. The third load string is once again deactivated at the next positive clock pulse edge of the clock signal CLK or the control signal VGS0. The signal VI3 delivered by the integrator 3 at that time controls the length of time of the activation of VGS0.

If insufficient current flows in the load String 3, the signal VI3 rises over the DC/DC cycles and prolongs the VGS0 pulses until a balance is reached. If excessive current flows in the load String 3, the signal VI3 drops over the DC/DC cycles and shortens the VGS0 pulses until a balance is reached.

In this arrangement, it is possible to influence individual LED strings by selectively changing the reference signal. The respective last load string in the chain prior to the next clock pulse edge of the control signal VGS0 or the clock signal CLK forwards its integrator output signal to the DC/DC control in order to adjust the period of the control signal VGS0.

Figure 8:
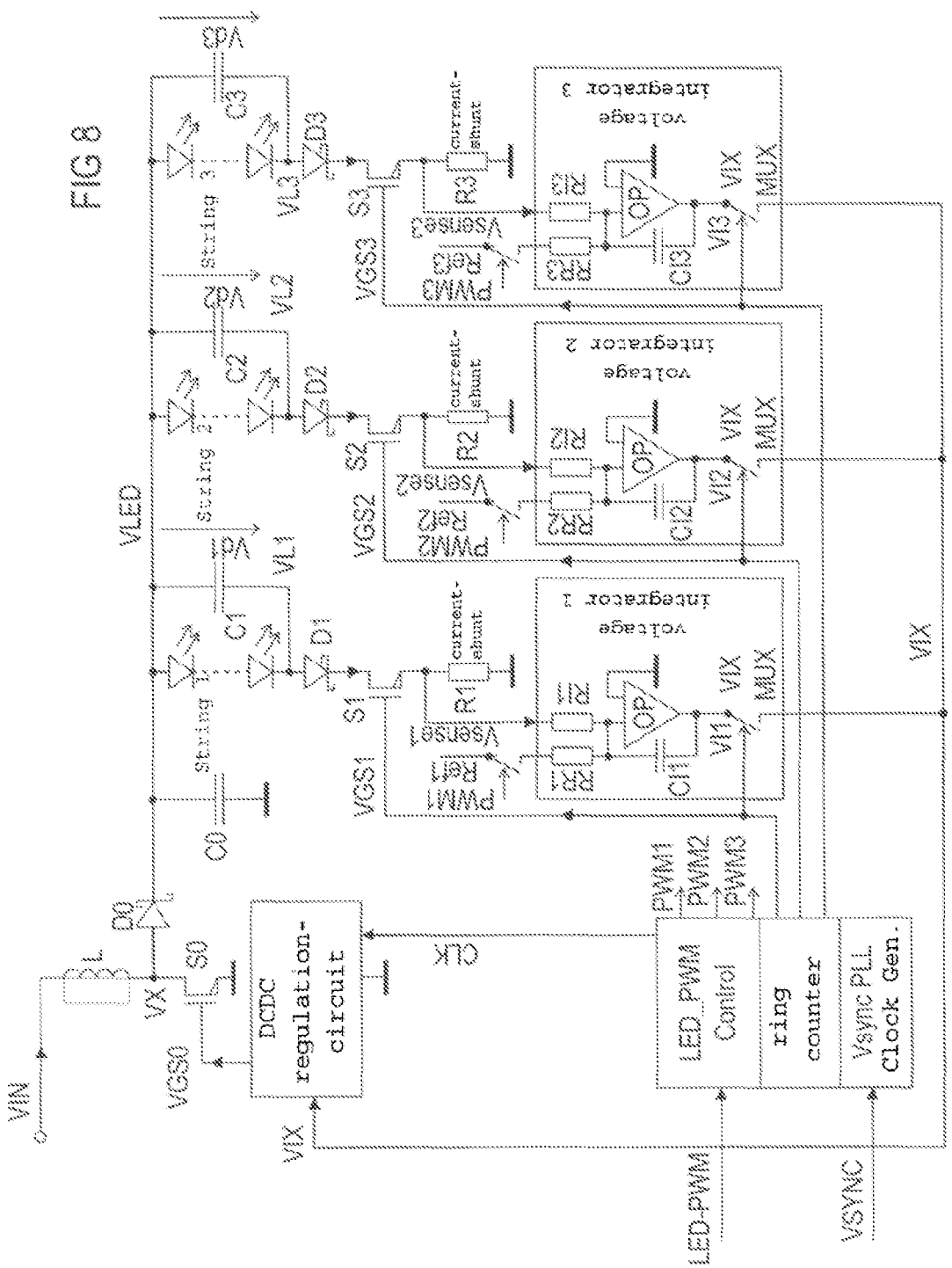
FIG. 8 shows a fifth embodiment of the invention.

FIG. 8 shows another embodiment. In this case, the time-multiplex control circuit 40 is equipped with a ring counter. This ring counter generates periodic control signals for respectively activating the switches S1, S2 and S3 of the individual load strings for one full DC/DC cycle. In addition, the relevant output of the voltage integrators 1, 2 and 3 is respectively fed back to the DC/DC control. It therefore receives the control signal VIX of the voltage integrator, the load string of which is currently active. In order to selectively disconnect the individual integrator outputs, switches that are actuated by the control signals VGS1 to VGS3 of the ring counter are arranged between the output of the operational amplifiers of the voltage integrators and the DC/DC control. In this way, the corresponding integrator signals VI1, VI2 and VI3 are only forwarded to the DC/DC control during the active phase of the respective string.

An LED PWM control is additionally provided in order to control the I-Last of each load string in time. These PWM control signals control an interruption of the supplier of individual load strings with coil current for entire ring counter cycles. During these inactive cycles, the reference signal also needs to be disconnected by the integrator. This is realized with switches between the voltage integrators and the reference terminal. In contrast to the preceding exemplary embodiment, a dedicated load string is assigned to each DC/DC cycle in this embodiment. Consequently, the coil L of the DC/DC current source, during each activation of the individual strings, is recharged to the correct value for this load string by the DC/DC control.

In contrast to the preceding exemplary embodiment, the ring counter is active in each clock pulse period of the DC/DC and the DC/DC control of the current source is also acted upon with the clock signal CLK. In other words, the coil L of the current source, during each activation of the individual strings, is recharged to the desired value by the DC/DC control. In the embodiment according to FIG. 3, in contrast, charging only takes place once during one period and not prior to each activation of an individual load string. The integrator outputs of the voltage integrators are also time-multiplexed in order to adjust the desired time period for activating the switch S0.

Figure 9:
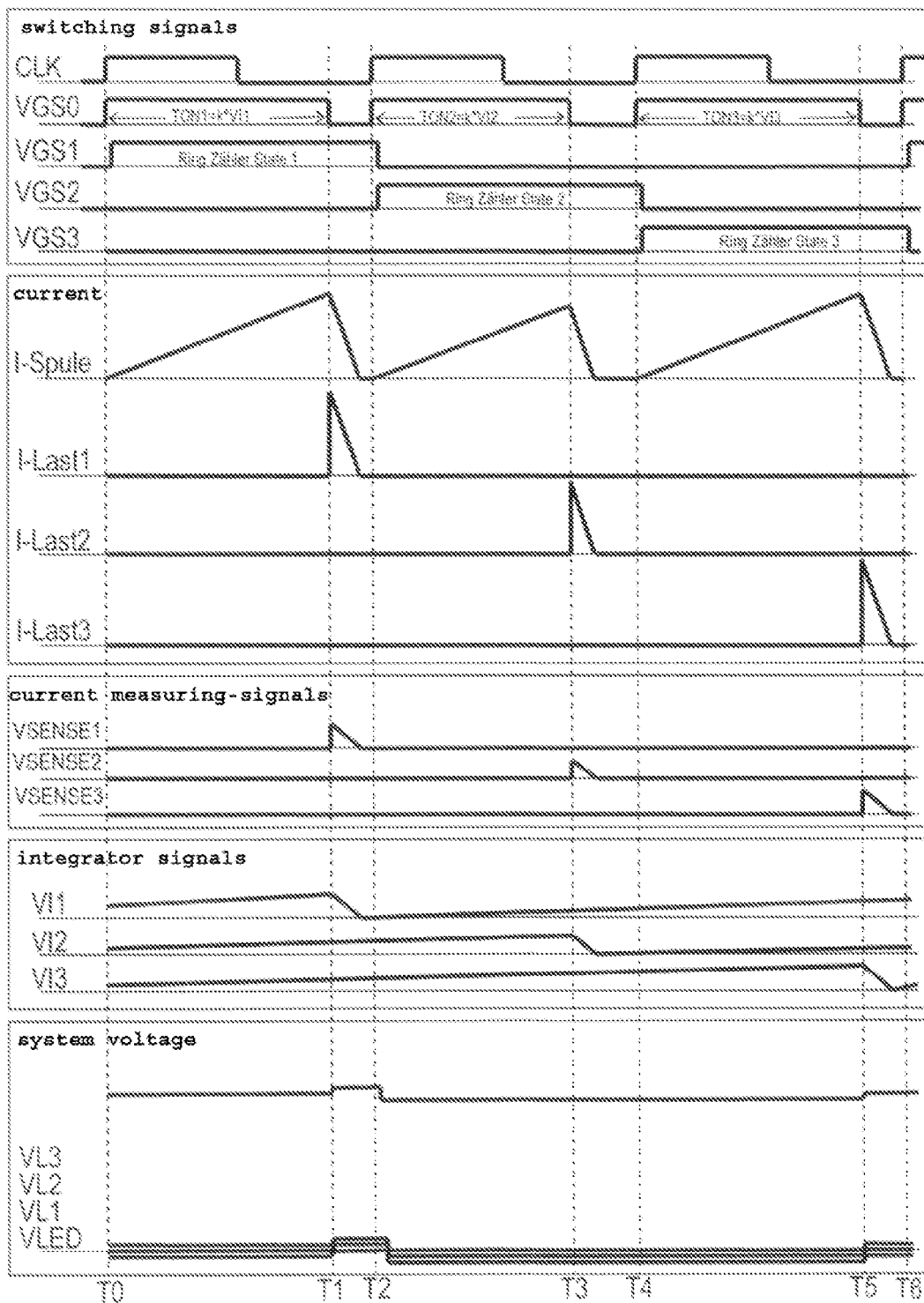
FIG. 9 shows a signal-time diagram in order to illustrate different signals during an operation of the embodiment according to FIG. 8.

According to the signal-time diagram in FIG. 9 that shows a discontinuous operating mode, this arrangement operates as follows.

The control signal VGS0 is activated with a positive clock pulse edge of a clock signal CLK such that the coil L is acted upon with a current. This causes the point VX of the current source to be set to the reference potential GND. If the diode D0 is neglected, VLED indicates the potential at the point VX during the charging phase of the coil. Consequently, it is possible to also output the control signal VGS1 of the ring counter with the positive clock pulse edge of the control signal VGS0 and to thusly activate the first string. The time period during which the switch S0 is closed is defined by a factor k*VI1. In this case, VI1 is the voltage that is delivered by the voltage integrator 1 and continues to increase during the time period up to the time T1. This results from the reference signal Ref1 being integrated by the capacitor CI1 due to the closed switch.

When the end of TON of the activation signal, VGS0 is reached or when a coil current I-Spule that is defined by k*VI1 is reached, the switch S0 is opened and the energy stored in the coil L discharges via the discharge current I-Last1 of the String 1. The discharge current leads to a voltage signal Vsense1 that is integrated and compensates the thus far integrated reference signal Ref1.

The time T6 corresponds to the time T0, wherein the ring counter has at that time activated each load string once in a cyclic fashion. In the steady state, the integrator output potentials are identical at both times T0 and T6. However, if it is higher at T6 than at T0, this means that insufficient energy for the corresponding load string was stored in the coil during the preceding period. If the potential is lower at T6 than at T0, excessive energy was stored in the coil during the preceding period and the "on-time" of the switch S0 can be reduced.

When the next positive clock pulse edge is reached at the time T2, the switch S0 is once again closed by the control signal VGS0 and the switch S2 is simultaneously activated by the control signal VGS2 delivered by the ring counter. The load String 2 is thusly connected to the current source. The time period during which the switch S0 remains closed is now defined by multiplying the factor k by the voltage signal VI2 of the second voltage integrator. Once the predetermined value is reached, the switch S0 is opened such that the current built up in the coil flows through the second load string in the form of a discharge current I-Last2. This causes the measuring resistor R2 to generate the voltage signal Vsense2 that is integrated in the voltage integrator 2 and subtracted from the constantly integrated reference signal Ref2.

When the next positive clock pulse edge is reached, the second load string is deactivated and the third load string is activated by the ring counter. The switch S0 of the current source is simultaneously closed again and a current is built up in the coil. The time period of the closed switch S0 for the third load string is defined by multiplying the proportionality constant k by the integrator signal VI3. After this time period has expired, the switch S0 is opened such that the current built up in the coil flows across the load String 3 and charges the capacitor C3. The integrated voltage signal Vsense3 is subtracted from the integrated reference signal REF3.

The period for the activation of the switch S0 is shortened or prolonged in dependence on the integrator signal at the beginning of a corresponding clock pulse edge. If the energy stored in the coil is insufficient, the integrator signal is higher than in the preceding activation period. This indicates that the charging process should be prolonged. However, if excessive current flowed through the corresponding load string, the time period for the next charging pulse becomes shorter for the corresponding load string.

The adjustment of the reference signal for the respective load string makes it possible to adjust an LED current and therefore a luminosity of each LED string, particularly in LED series circuits. In the arrangement shown, it is furthermore possible to selectively activate or deactivate individual load strings for entire periods by means of correspondingly generated PWM signals.

Figure 10:
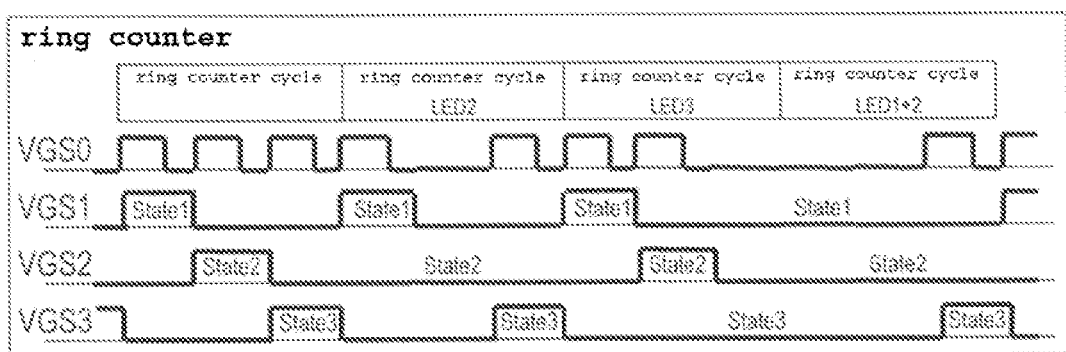
FIG. 10 shows a signal-time diagram in order to illustrate the selective activation of individual strings in the embodiment according to FIG. 8.

FIG. 10 shows a signal-time diagram in which the ring counter can selectively activate or deactivate individual load strings by means of a suitable activation. In the exemplary embodiment, all three LED load strings are activated for the first cycle as indicated with the corresponding control signals VGS1, VGS2 and VGS3. The second LED string remains deactivated in the second ring counter cycle. To this end, the control signals VGS0 and VGS2 are suppressed at the corresponding times, their clock pulse edges are deactivated and the level remains low. In the third cycle, the third LED string is deactivated by suppressing the control signals VGS0 and VGS3. In the last cycle of the ring counter, only the third LED string is ultimately active while the two first LED Strings 1 and 2 remain deactivated. A charging current is prevented by suppressing the control signal VGS0. The control circuit of the unit LED_PWM Control is simultaneously designed in such a way that it delivers activation signals to the respective switches between the reference terminal and the integration capacitor of the voltage integrator. In order to deactivate a load string, it is necessary to also deactivate the reference signal for one complete cycle of the ring counter in order to prevent an additional integration and therefore an incorrect output value in the integration signal.

This embodiment is particularly suitable for a discontinuous operating mode, in which the current built up in the coil L of the current source drops to zero during the activation of the corresponding load string.

The control for a continuous operating mode, in which the current in the coil L does not drop to zero, is more complicated. In these instances, the control circuit should only activate all active load strings in a rotating fashion by means of the ring counter for successive cycles of the DC/DC current source. Each of the active load strings receives current pulses with a higher frequency due to the smaller number of active load strings.

The voltage integrator needs to suitably reduce the intensity of the current pulses with its feedback to the DC/DC control circuit in order to determine the correct average current.

Figure 7:
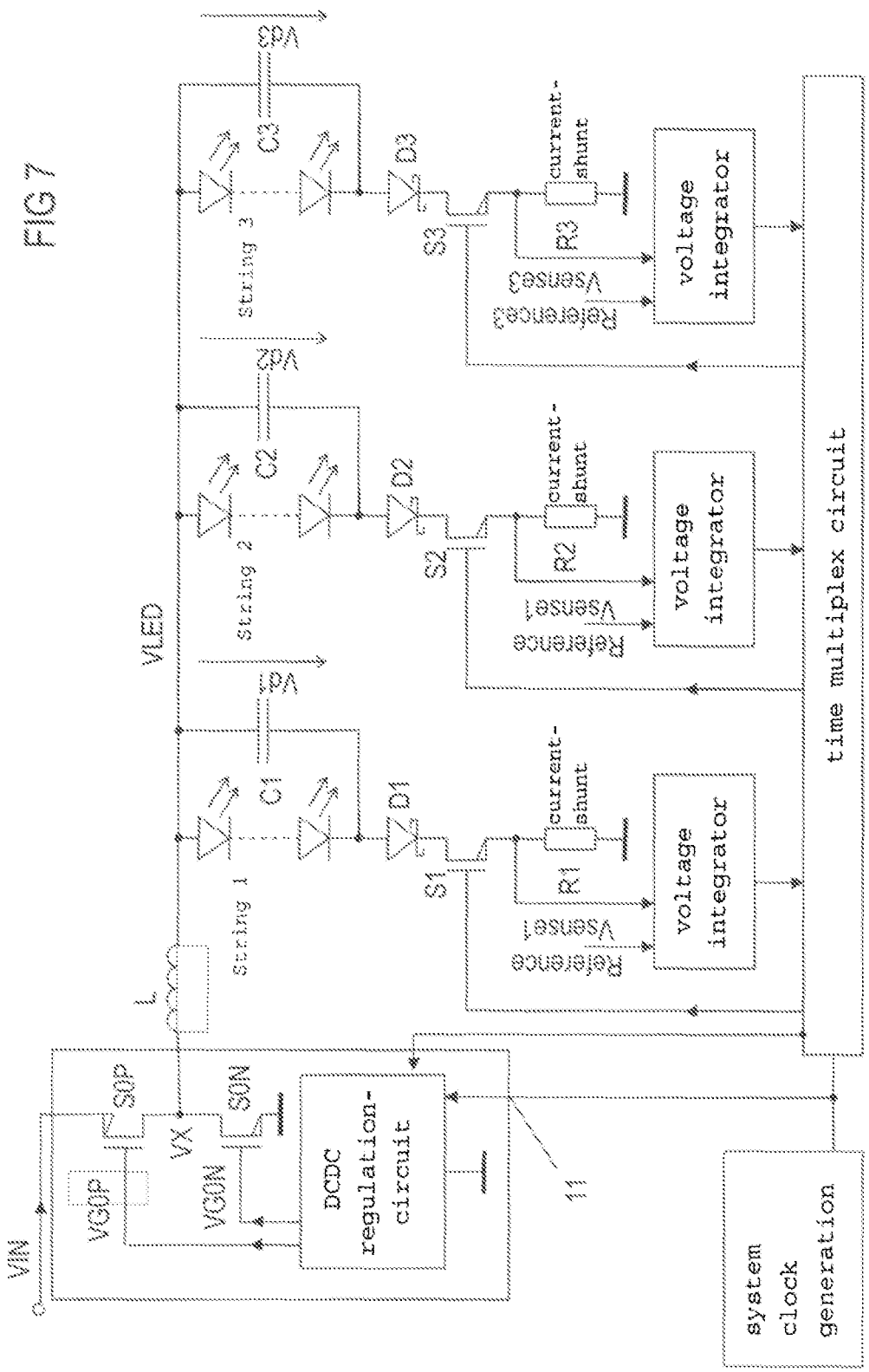
FIG. 7 shows another embodiment of the invention with a different DC/DC current source.

FIG. 7 shows an embodiment with a current source that is realized differently. In contrast to the boost-types described so far, the current source in this embodiment is realized in the form of a buck-type DC/DC converter. For this purpose, the current source comprises two transistors SOP and SON that are connected in series and activated by control signals VG0N and VG0P of a DC/DC voltage regulator. A node VX situated between the transistors is connected to the individual load strings String 1 to String 3 via a coil.

In contrast to the system with boost-type current sources described so far, the LED strings are in this case already supplied with power when a current is built up in the coil L due to the activation of the transistor SOP by means of the control signal VG0P. Consequently, the activation of the individual load strings by means of the switches S1 to S3 already needs to take place at the start of a cycle of the current source rather than after the deactivation as described above, for example, with reference to FIGS. 2 and 3. In other respects, this arrangement functions similar to the above-described embodiments.

Individual load strings can be activated or deactivated in a discontinuous operating mode. The switches of the DC/DC current source are operated as long as at least one LED string is active per cycle of the current source. If all strings are deactivated, the last string needs to remain active until the current in the coil L has dropped to zero. Similar to the embodiment described with reference to FIG. 4, the last active LED string in the chain of LED strings during one cycle of the current source generates the feedback signal for controlling the DC/DC voltage regulator of the current source. If the time-multiplexed circuit illustrated in FIG. 7 is implemented similar to FIG. 8, the individual strings are also successively activated by the ring counter in this case. If the active load strings are reduced, each active load string receives a current pulse with a higher frequency. The current pulses are accordingly reduced due to the feedback of the voltage integrators to the DC/DC control circuit in order to maintain the correct average current.

Figure 11:
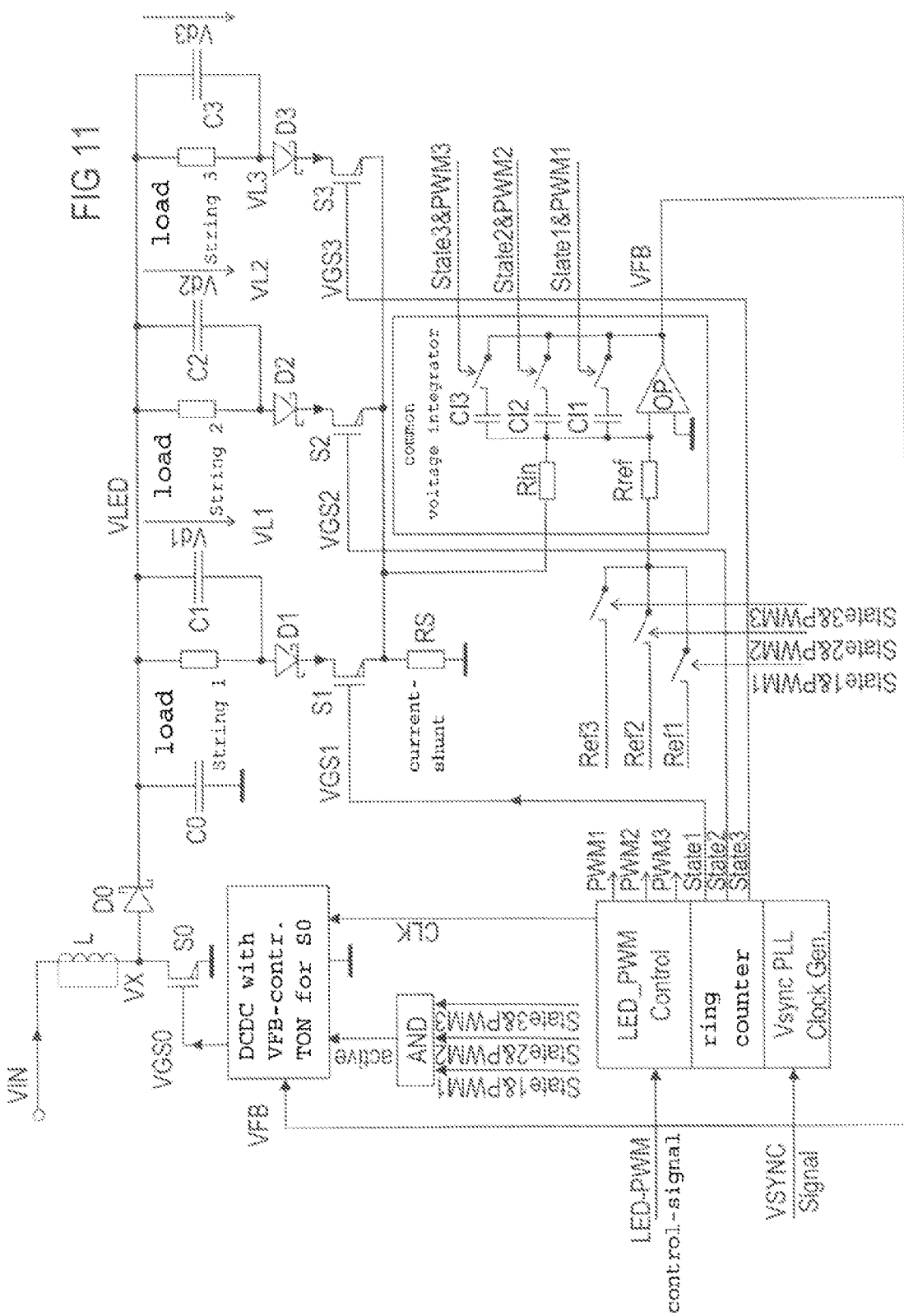
FIG. 11 shows a sixth embodiment of the invention.

FIG. 11 shows another embodiment of the invention that systematically follows up on the proposed principle of an activation by means of time-multiplexing. In this case, in particular, one individual voltage integrator is provided and used as a common voltage integrator for all connected load strings. According to the illustration, the arrangement comprises a current source with a DC/DC regulator, to which a clock signal CLK, an activation signal active and a voltage control signal VFB are fed for control purposes. The latter serves for adjusting the time period of the control signal VGS0 during one clock pulse period. The output side of the DC/DC regulator is connected to the switch S0 that is coupled to the supply voltage terminal via the coil L. Three load strings String 1, String 2 and String 3 are arranged in parallel at the node VX by means of an optional diode D0.

Each load string comprises a load resistor that is connected in parallel to a capacitor C1, C2 or C3. A diode D1, D2 or D3 is respectively provided and a switch S1, S2 and S3 is respectively connected in series to the parallel circuit formed by the respective load and the assigned charge storage means. The switches are actuated by corresponding control signals VGS1, VGS2 and VGS3 that are once again generated by a ring counter. All switches are furthermore connected to a common current measuring resistor RS. During the operation of each load string, a voltage that results from the current across the respectively activated load string and the resistance of the measuring resistor RS drops across this current measuring resistor.

The voltage drop is fed to a common voltage integrator. This voltage integrator comprises an input resistor Rin that is connected to the node of the measuring resistor RS, as well as a reference resistor Rref for supplying different reference signals Ref1, Ref2 and Ref3. In addition, parallel charge storage means CI1, CI2 and CI3 that serve as integrators are connected to the two resistors Rin and Rref. The number of charge storage means arranged in parallel corresponds to the number of parallel-connected load strings in the exemplary embodiment. Depending on the currently activated load string, one of the capacitors can be connected to the operational output amplifier OP of the common voltage integrator by means of corresponding switches. In addition, a switch is provided between the reference terminals and the reference resistor Rref such that the respectively correct reference signal is connected to the resistor Rref during the operation. The output of the operational amplifier with its control signal VFB is connected to the corresponding control signal input of the DC/DC regulator.

According to the time-dependency diagram in FIG. 10, the control signal VGS0 for actuating the switch S0 of the current source is generated with each positive clock pulse edge of the clock signal CLK. The time period, in which the switch S0 is closed and a current is built up in the coil L as a result of the closed switch, is adjusted in dependence on the control signal VFB. The LED_PWM control circuit generates PWM signals PWM1, PWM2 and PWM3 in accordance with the load strings String 1, String 2 and String 3 to be activated for the purpose of a luminosity control. For example, if the load string 1 is activated, the ring counter generates the signal State1 and the LED_PWM control circuit generates the control signal PWM1. These two signals are fed to the logic gate AND that subsequently delivers the control signal active for the DC/DC regulator. This activation signal is simultaneously fed to the respective switch of the common voltage integrator. The switches for the reference signal REF1 and the capacitor CI1 are closed in response to these signals State1 and PWM1. The DC/DC regulator generates the control signal VGS0 with the positive clock pulse edge of the clock signal CLK, wherein the time period for the control signal VGS0 is defined by the control signal VFB. The ring counter simultaneously activates the switch S1 and therefore the first load string with its signal State1.

After the defined time period has expired, the switch S0 is opened such that the current now being built up in the coil L flows across the load string 1. The load current I-Last1 is converted into a voltage signal at the resistor RS and subtracted from the signal integrated so far by means of the reference signal REF1 in the voltage integrator.

At the negative clock pulse edge of the signal State1 of the ring counter, the switch S1 of the first load string, as well as the switches for the reference signal Ref1 and the capacitor CI1, is opened. The signal that is now stored in the capacitor CI1 is evaluated in the next cycle of the load String 1 in order to once again determine the time period for the control signal VGS0. The ring counter simultaneously generates the control signal State2 and thusly activates the second load string. The logic gate generates the corresponding activation signal together with the control signal PWM2, activates the DC/DC regulator and closes the switches for the capacitor CI2 and the reference signal Ref2 in the common voltage integrator. The voltage value of the preceding cycle stored in the capacitor CI2 forms the control signal VFB that is used for the time period of the signal VGS0 of the DC/DC regulator. After the current buildup in the coil L, the switch S0 is opened and the coil current flows through the second load string in the form of the load current I-Last2.

In the current measuring resistor RS, the second load current I-Last2 generates a voltage signal that is subtracted from the second reference signal Ref2 integrated so far in the capacitor CI2 by means of the resistor Rin. The ring counter deactivates the signal State2 and now connects the third load string.

This cyclic rotation between the different load strings is repeated for each load string that should be activated in accordance with the control signal of the LED_PWM control circuit. If a load string is skipped, the corresponding control signal PWM is set to a lower level during this time period. In this way, the switches of the common voltage integrator remain open during this time period and the DC/DC regulator is deactivated during this time. The ring counter likewise generates no corresponding status signal.

Figure 12:
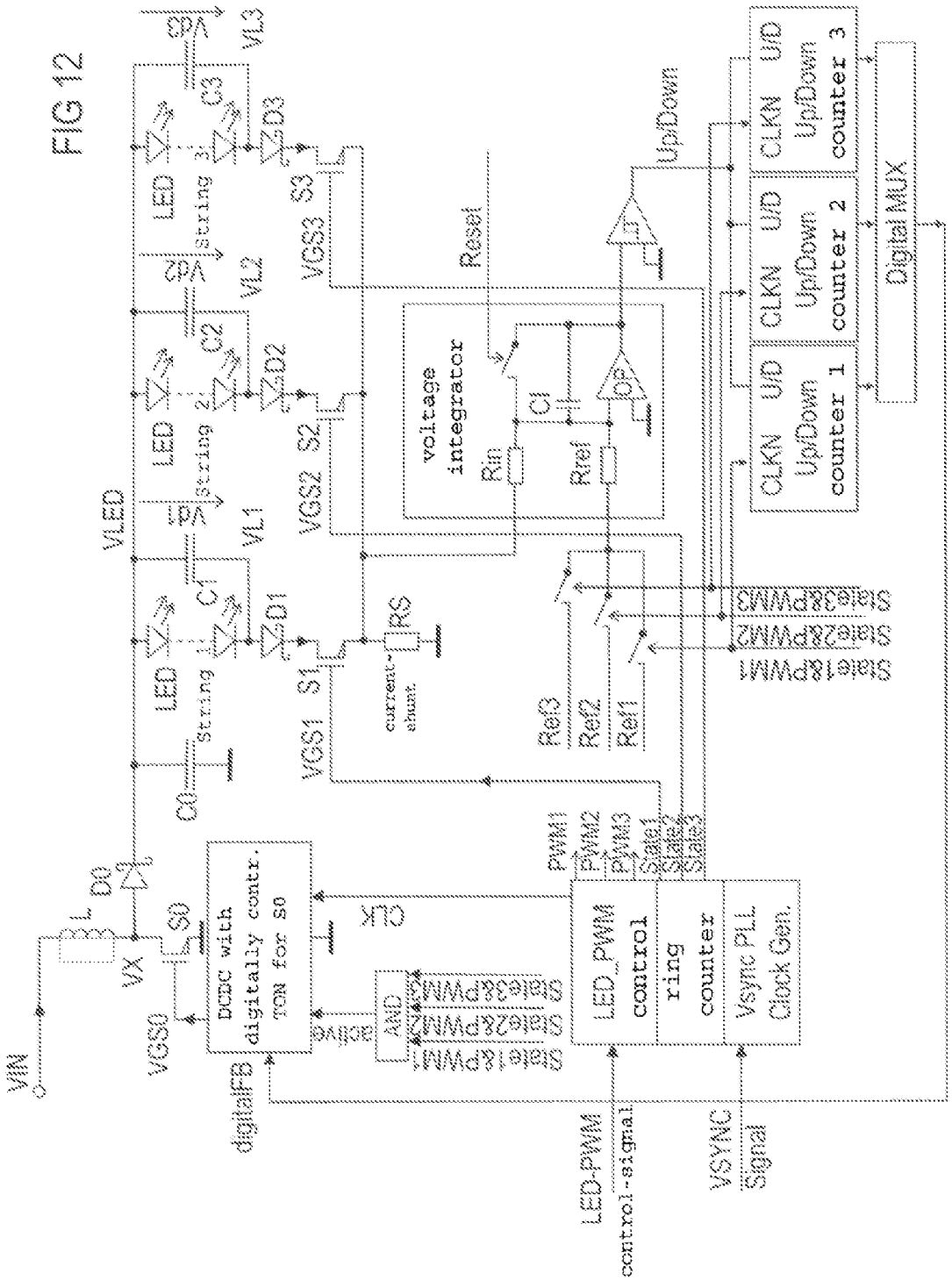
FIG. 12 shows a seventh embodiment of the invention.

Another embodiment is illustrated in FIG. 12. In this case, a digital logic evaluation circuit is used for generating the control signal for the DC/DC regulator. In this way, the common voltage integrator can be implemented with only one individual capacitor CI. This capacitor is discharged by means of a reset signal Reset prior to each activation of an individual load string.

In addition to an input resistor Rin that is connected to a measuring resistor RS, the voltage integrator also comprises a reference resistor Rref, to which the reference signals Ref1, Ref2 or Ref3 can be applied. A common capacitor CI serves for integrating the different reference signals, as well as the voltage signal derived from the load current. On its output side, the operational amplifier of the voltage integrator is connected to a comparator that generates a simple control signal UP/DOWN. This control signal is fed to a storage unit that consists of three counters in this embodiment.

Each counter is connected to the output of the logic gate with its clock signal input CLKN and therefore evaluates the signal of the ring counter and the corresponding control signal PWM. The activated counter is respectively incremented or decremented in accordance with the supplied signal UP/DOWN with each cycle of this signal, i.e., at the end of the active phase of a load string. The value of this counter that is processed in a digital multiplexer forms the digital control signal digitalFB for the DC/DC regulator and therefore defines the time period of the control signal VGS0 in the next cycle.

In this implementation, only one capacitor is required in the voltage integrator. A storage of the time period values takes place in a downstream storage means. In this way, the power supply circuit can also be reset without requiring another elaborate transient phase during a reactivation of the power supply circuit. In these instances, the values stored in the counters can be directly utilized for adjusting the time period for the control signal VGS0. On the other hand, the accuracy of the time period is dependent on the depth of the counters used. In this respect, it would also be possible to utilize an analog/digital converter that directly converts the signal delivered by the operational amplifier OP of the voltage integrator into a digital value instead of the comparator. This ADC output signal can, if it is correspondingly added to the current count of the counter, result in the new count of the counter for the next cycle of this string.

I claim:

1. A controlled power supply circuit for supplying power to at least two loads connected thereto, comprising:
    a current source that can be operated in a clocked fashion and that comprises a control input for adjusting the power;
    a control circuit; and
    at least two load strings that are connected in parallel between a power supply terminal that is coupled to the current source and a reference terminal,
    wherein each load string comprises:
        a load, as well as a charge storage means that is connected in parallel to the load,
        a switch for selectively switching the current path of the load string, and
        a sensor with a sensor resistor that is connected to the current path of the load string and serves for registering a current flowing through the connected load string,
    wherein the control circuit is coupled to the switch and to the sensor of each load string in order to activate each load string in a time-multiplexed fashion, and
    wherein the at least two load strings are not activated simultaneously by the activation in the time-multiplexed fashion.

2. The power supply circuit according to claim 1, wherein the control input of the current source is coupled to the sensors.

3. The power supply circuit according to claim 1, wherein the control input of the current source is coupled to the last sensor of the load string activated by the control circuit during one cycle of a time-multiplexed activation of each load string.

4. The power supply circuit according to one of claims 1 to 3, wherein each load string furthermore comprises:
    a diode, preferably a Schottky diode, that is connected in series to the switch and the parallel circuit formed by the charge storage means and the load.

5. The power supply circuit according to claim 1, further comprising at least one of the following:
    an element that has an inductance and is arranged between a supply voltage terminal and the load strings;
    a diode, preferably a Schottky diode, the cathode side of which is connected to the at least two load strings and the anode side of which is connected to the power supply terminal; or
    a charge storage means that is connected in parallel to the at least two load strings.

6. The power supply circuit according to claim 1, wherein each sensor comprises a voltage integrator that delivers an integrated evaluation signal to the control circuit based on a reference signal and a signal made available by the sensor resistor.

7. The power supply circuit according to claim 6, wherein the voltage integrator comprises an operational amplifier and a charge storage means that is connected between an input and an output of the operational amplifier, and
    wherein the voltage integrator is designed for forming the difference between the reference signal and a signal of the sensor resistor.

8. The power supply circuit according to claim 1, wherein the control circuit comprises a logic circuit, preferably a flip/flop circuit, that comprises a switching signal for activating a load string in dependence on an activation signal of a previously activated load string.

9. The power supply circuit according to claim 1, wherein the control circuit comprises a ring counter that is coupled to the switch of each load string in order to realize the cyclic activation thereof.

10. The power supply circuit according to claim 1, wherein the control circuit comprises at least one control input in order to selectively activate or deactivate at least one of the at least two load strings.

11. The power supply circuit according to claim 1, wherein the current source that can be operated in a clocked fashion comprises a DC/DC converter.

12. The power supply circuit according to claim 1, wherein a capacitance of the charge storage means is chosen such that a time constant defined by a resistance of the load and the capacitance of the charge storage means connected in parallel to the load is higher than a switching frequency of the current source by at least the factor 5.

* * * * *